United States Patent
Kojima et al.

(10) Patent No.: US 11,490,236 B2
(45) Date of Patent: Nov. 1, 2022

(54) MTC DEVICE, METHOD AND APPARATUS

(71) Applicant: YOKOGAWA ELECTRIC CORPORATION, Tokyo (JP)

(72) Inventors: Osamu Kojima, Tokyo (JP); Atsushi Wada, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 29 days.

(21) Appl. No.: 17/109,178

(22) Filed: Dec. 2, 2020

(65) Prior Publication Data

US 2021/0195392 A1 Jun. 24, 2021

(30) Foreign Application Priority Data

Dec. 19, 2019 (JP) .............................. JP2019-229312

(51) Int. Cl.
*H04W 4/00* (2018.01)
*H04W 4/70* (2018.01)
*H04W 8/18* (2009.01)
*H04W 48/18* (2009.01)
*H04W 88/06* (2009.01)

(52) U.S. Cl.
CPC ............. *H04W 4/70* (2018.02); *H04W 8/183* (2013.01); *H04W 48/18* (2013.01); *H04W 88/06* (2013.01)

(58) Field of Classification Search
CPC ..... H04W 36/08; H04W 36/10; H04W 36/06; H04W 36/03; H04W 36/14; H04W 36/165; H04W 36/16; H04W 36/18; H04W 36/36; H04W 36/365; H04W 48/18; H04W 48/20; H04W 56/004; H04W 60/005; H04W 60/02; H04W 60/04; H04W 60/06; H04W 4/70; H04W 88/06

USPC ......................................................... 370/329
See application file for complete search history.

(56) References Cited

U.S. PATENT DOCUMENTS

| 10,716,019 | B1 * | 7/2020 | Velusamy | H04W 24/06 |
| 2010/0311402 | A1 * | 12/2010 | Srinivasan | H04W 4/50 455/418 |
| 2010/0311404 | A1 | 12/2010 | Shi | |

(Continued)

FOREIGN PATENT DOCUMENTS

| JP | 2009055325 A | 3/2009 |
| JP | 2014053935 A | 3/2014 |

(Continued)

OTHER PUBLICATIONS

Extended European Search Report for counterpart European Application No. 20209849.7, issued by the European Patent Office dated Sep. 13, 2021.

(Continued)

*Primary Examiner* — Huy C Ho

(57) ABSTRACT

An MTC device is provided, including: a memory unit for storing a switching condition for switching at least any one of a SIM and a communication carrier in association with each of sets of the SIM and communication carrier; a measuring unit for measuring communication quality for a set of the SIM and the communication carrier currently in use; and a control unit for controlling the switching of at least any one of the SIM and the communication carrier, when the communication quality satisfies the switching condition associated with the set of the SIM and the communication carrier currently in use.

13 Claims, 8 Drawing Sheets

(56) References Cited

U.S. PATENT DOCUMENTS

| | | | |
|---|---|---|---|
| 2013/0012208 A1* | 1/2013 | Jeong | H04W 8/183 |
| | | | 455/435.2 |
| 2013/0329639 A1 | 12/2013 | Wietfeldt | |
| 2015/0092611 A1 | 4/2015 | Ponukumati | |
| 2015/0257071 A1 | 9/2015 | Tsuda | |
| 2018/0014239 A1 | 1/2018 | Chau | |

FOREIGN PATENT DOCUMENTS

| | | |
|---|---|---|
| JP | 2015527774 A | 9/2015 |
| JP | 2016208168 A | 12/2016 |
| JP | 2017195455 A | 10/2017 |
| WO | 2014002533 A1 | 1/2014 |

OTHER PUBLICATIONS

Office Action for European Patent Application No. 20209849.7, issued by the European Patent Office dated May 7, 2021.
Office Action issued for counterpart Japanese Application No. 2019-229312, issued by the Japanese Patent Office dated Jun. 28, 2022 (drafted on Jun. 24, 2022).

* cited by examiner

MTC DEVICE, METHOD AND APPARATUS

The contents of the following Japanese patent application(s) are incorporated herein by reference:
NO. 2019-229312 filed in JP on Dec. 19, 2019

1. TECHNICAL FIELD

The present invention relates to an MTC device, a method and an apparatus.

2. RELATED ART

Conventionally, terminals have been known that support dual-SIM (Subscriber Identity Module) capable of installing two SIMs. (Refer to Patent Document 1, for example).

PRIOR ART DOCUMENTS

Patent Document

Patent Document 1: Japanese Patent Application Publication No. 2016-208168.

According to the dual-SIM terminal in Patent Document 1, when communication volume by one SIM exceeds the upper limit, the switching to the other SIM will be automatically performed. However, depending on the contract situation, a single SIM may be able to use a plurality of wireless communication networks provided by a plurality of communication carriers. Therefore, properly controlling the switching of communication by treating the set of the SIM and the communication carrier as one unit is desired.

SUMMARY

To solve the above problem, a first aspect of the present invention provides an MTC device. The MTC device may include a memory unit for storing switching conditions for switching at least any one of the SIM and the communication carrier, in association with each of the plurality of sets of SIMs and communication carriers. The MTC device may include a measuring unit for measuring the communication quality for the set of the SIM and the communication carrier currently in use. The MTC device may include a control unit for controlling the switching of at least any one of the SIM and the communication carrier, when the communication quality satisfies a switching condition associated with the set of the SIM and the communication carrier currently in use.

A second aspect of the present invention provides a method performed by the MTC device. The method may include storing, by the MTC device, switching conditions for switching at least any one of a SIM and a communication carrier, in association with each of the plurality of sets of SIMs and communication carriers. The method may include measuring, by the MTC device, communication quality for the set of the SIM and the communication carrier currently in use. The method may include controlling, by the MTC device, the switching of at least any one of the SIM and the communication carrier, when the communication quality satisfies a switching condition for the set of the SIM and the communication carrier currently in use.

A fourth aspect of the present invention provides an apparatus. The apparatus may include a communication quality acquisition unit for acquiring information about the communication quality measured by one or more devices. The apparatus may include a contract terms acquisition unit for acquiring information about the communication contract terms for each device. The apparatus may include a priority table generation unit for generating the priority table for each device, containing switching conditions to the priority and the next priority for each set of a SIM and a communication carrier, at least based on the information about the communication quality acquired from the one or more devices, and the information about the communication contract terms for each device. The apparatus may include a priority table output unit for outputting the generated priority table to a target device.

A fifth aspect of the present invention provides a method. The method may include acquiring information about communication quality measured by one or more devices. The method may include acquiring information about communication contract terms for each device. The method may include generating a priority table for each device, containing switching conditions to the priority and the next priority for each set of a SIM and a communication carrier, at least based on the information about the communication quality acquired from the one or more devices, and the information about the communication contract terms for each device. The method may include outputting the generated priority table to a target device.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described with reference to embodiments of the invention. However, the following embodiments shall not be construed as limiting the claimed invention. Also, not all combinations of features described in the embodiments are essential for means to solve problems provided by aspects of the invention.

Figure 1:
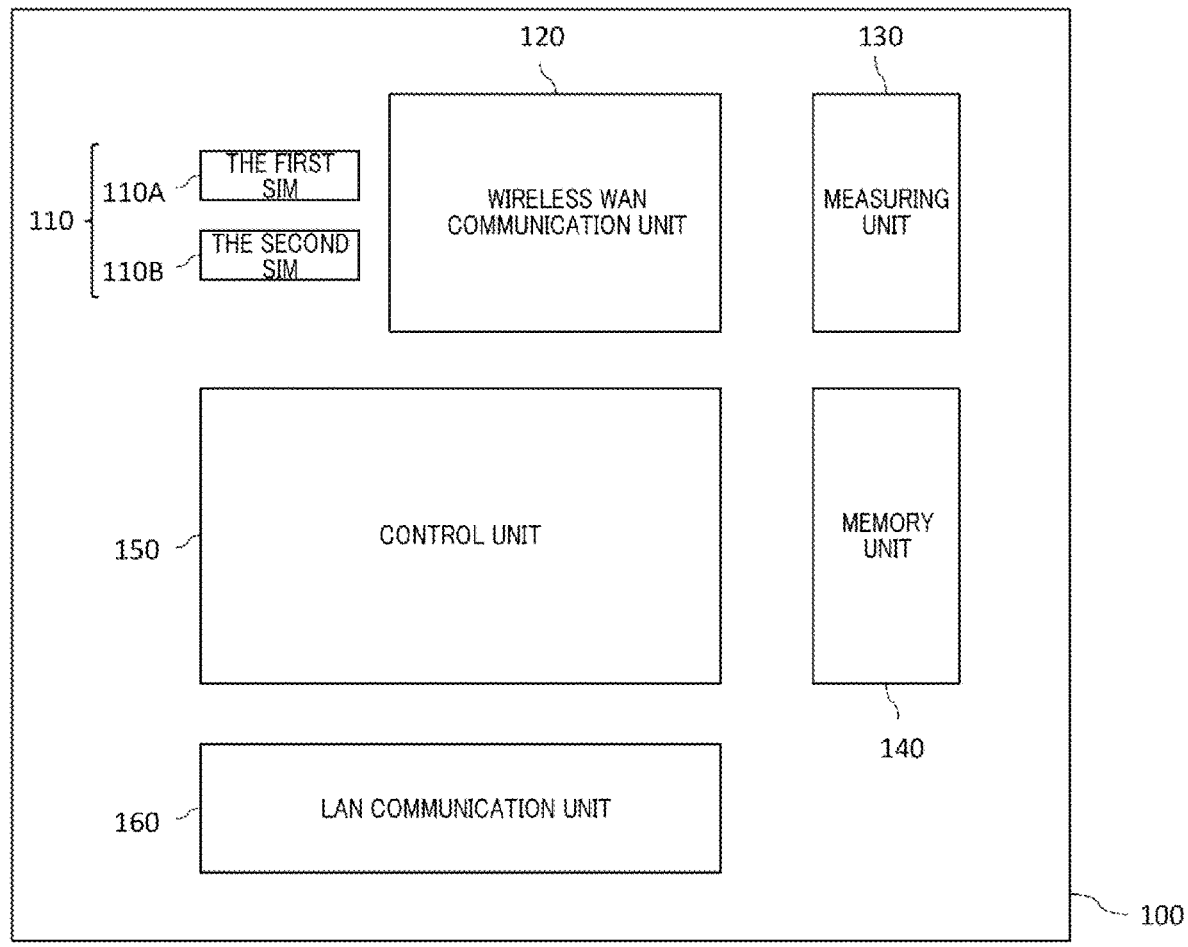
FIG. 1 illustrates one example of a block diagram of an MTC device 100 according to this embodiment.

FIG. 1 illustrates one example of a block diagram of an MTC device 100 according to this embodiment. The communication device according to this embodiment, especially the MTC device 100, controls the switching of at least any one of a SIM and a communication carrier by treating a set of the SIM and the communication carrier as one unit when communication quality satisfies the switching conditions associated with each set.

Herein, MTC (Machine Type Communication) is generally defined as a form of data communication that does not necessarily require human intervention. Therefore, the MTC device 100 may include all devices capable of achieving data communication that does not necessarily require human intervention. In this embodiment, one example in which the MTC device 100 is a mobile router installed in a plant will be described. That is, the MTC device 100 includes a LAN (Local Area Network)-side interface for communicating with field devices connected to the LAN in the plant, and a WAN (Wide Area Network)-side interface for communicating with devices connected to the WAN. MTC device 100 relays communications between the field devices installed in the plant and the device connected to the WAN. This enables the MTC device 100 to connect the field devices installed in the plant to, for example, a global network such as the Internet.

Such plants may be, for example, besides industrial plants such as chemical plants, plants for controlling and managing wellheads and surroundings of gas or oil fields, plants for controlling and managing power generation such as hydro, thermal, nuclear power generation, plants for controlling and managing environmental power generation such as solar and wind power generation, and plants for controlling and managing water supply and sewerage or dams, and so on.

Also, the field devices installed in such plants may be, for example, sensor devices such as pressure gauges, flow meters or temperature sensors, valve devices such as flow control valves or switch valves, actuator devices such as fans or motors, imaging devices such as cameras or videocameras that capture conditions and objects in the plant, acoustic devices such as microphones or speakers that collect unusual sounds or the like in the plant or emit alarm sounds or the like, and location detector devices that output location information for each device.

However, it is not limited to this. The MTC device 100 may also be a different device than a mobile router, such as a PC (personal computer), a tablet computer, a smart phone, a gateway and a modem. In addition, the MTC device 100 may be installed in different locations than the plant, such as parks, shopping centers, office buildings, condominiums, and public facilities.

The MTC device 100 according to this embodiment includes a SIM 110, a wireless WAN communication unit 120, a measuring unit 130, a memory unit 140, a control unit 150 and a LAN communication unit 160. These blocks are each a functionally separated functional block, and may not necessarily correspond to the actual device configuration. Therefore, even though each block is shown as a single block, each block may not be necessarily configured by a single device in this diagram. Also, even though the blocks are shown as separate blocks, the blocks may not be necessarily configured by separate devices in this diagram.

The SIM 110 records a unique number to identify a subscriber, called IMSI (International Mobile Subscriber Identity). The SIM 110 may be a SIM card inserted in a slot, or may be an eSIM (Embedded-SIM) in a software form. Such a SIM 110 is lent by communication carriers that are mobile network operators establishing and operating line facilities and providing wireless communication services. Alternatively, or additionally, SIM 110 may be lent from an MVNO (Mobile Virtual Network Operator), which is a virtual mobile network operator that borrows communication lines from a communication carrier to provide wireless communication services. Also, the SIM 110 may be a prepaid SIM that is configured to expire after a certain period of time from the last use, without the need to be returned to the operator. As one example, in this embodiment, the SIM 110 has a first SIM 110A, and a second SIM 110B. However, it is not limited to this. The SIM 110 may have one or more SIMs, which are more or fewer than two.

The wireless WAN communication unit 120 uses any of the SIMs 110 to connect to any of a plurality of wireless communication networks provided by a plurality of communication carriers, to perform wireless communications, such as a mobile phone communication network (5G, LTE-A, LTE, HSPA+, HSPA, and WCDMA (registered trademark) and so on), a WiMAX (Worldwide Interoperability for Microwave Access) network and a PHS (Personal Handyphone System) network. For example, the wireless WAN communication unit 120 uses the first SIM 110A lent from a communication carrier X, and connects to a wireless communication network provided by the communication carrier X to perform wireless communications. In addition to this, the wireless WAN communication unit 120 can connect, by adopting the roaming technology, to a wireless communication network provided by a different communication carrier than the operator providing the SIM to perform wireless communications. For example, the wireless WAN communication unit 120 can connect to a wireless communication network provided by a communication carrier Z by using the first SIM 110A lent from the communication carrier X, to perform wireless communications. Also, the wireless WAN communication unit 120 can connect to the wireless communication network provided by the communication carrier X by using the second SIM 110B lent from the MVNO to perform wireless communications. Furthermore, the wireless WAN communication unit 120 can connect to a wireless communication network provided by a communication carrier Y by using the second SIM 110B lent from the MVNO to perform wireless communications.

In this manner, the MTC device 100 can select any of the plurality of wireless communication networks provided by the plurality of communication carriers, using a single SIM 110. Therefore, the MTC device 100 selects whether to connect to a wireless communication network provided by which communication carrier by using which SIM 110. That is, the MTC device 100 selects a wireless communication network to be connected, by treating a set of the SIM and the communication carrier as one unit. And, such a set of the SIM 110 and the communication carrier may include at least one roaming set whose communication carrier is different from the operator providing the SIM.

Moreover, when such a set of the SIM 110 and the communication carrier is used to perform wireless communications, lines assigned for communications, fees charged for communications and the like will be in accordance with the individual contract respectively entered into for each set.

The measuring unit 130 measures communication quality for the set of the SIM 110 and the communication carrier currently in use. For example, the measuring unit 130 measures quality of wireless communications for the set of the SIM 110 and the communication carrier, when the wireless WAN communication unit 120 uses one SIM 110 to connect to one of the plurality of wireless communication networks provided by the plurality of communication carriers, to perform wireless communications. For example, the measuring unit 130 measures, as the communication quality, which communication technology wireless communication network was provided, data communication speed, packet error rate, disconnection frequency, time to connect, and signal response time and so on. Also, the measuring unit 130 may measure not only the communication quality, but also the cumulative data usage during a predetermined period (for example, a month). The measuring unit 130 provides information about the measured communication quality to the control unit 150.

The memory unit 140 stores the switching conditions for switching at least any one of the SIM 110 and the communication carrier, in association with to each of the plurality of sets of the SIMs 110 and the communication carriers. On this occasion, the memory unit 140 further stores a priority corresponding to each of the plurality of sets. That is, the memory unit 140 may have a priority table about the plurality of sets of the SIMs 110 and the communication carriers. Such a plurality of sets of the SIMs 110 and the communication carriers may include at least one roaming set whose communication carrier is different from the operator providing the SIM 110, as described above. The details of the priority table are described below. The memory unit 140 provides the switching condition associated with the selected set of the SIM 110 and the communication carrier to control unit 150.

The control unit 150 compares the communication quality provided by the measuring unit 130 and the switching condition provided by the memory unit 140. And when the communication quality satisfies the switching condition of the set of the SIM 110 and the communication carrier currently in use, the control unit 150 controls the switching of at least any one of the SIM 110 and the communication carrier. On this occasion, the control unit 150 switches at least any one of the SIM 110 and the communication carrier according to the priority. That is, when the communication quality satisfies the switching condition, the control unit 150 switches at least any one of the SIM 110 and the communication carrier, so that the priority of the set of the SIM 110 and the communication carrier becomes the next priority.

The LAN communication unit 160 performs communications with the field devices connected to LAN in the plant. Moreover, the LAN here refers to local networks in general, and is not limited to a specific communication standard. As one example, the LAN communication unit 160 may connect with the field devices installed in the plant, by using a cable in a wired manner. Alternatively, or additionally, the LAN communication unit 160 may wirelessly connect with the field devices installed in the plant, via communications compliant with, for example, IEEE 802.11 standard or IEEE 802.15.1 standard and so on.

Figure 2:
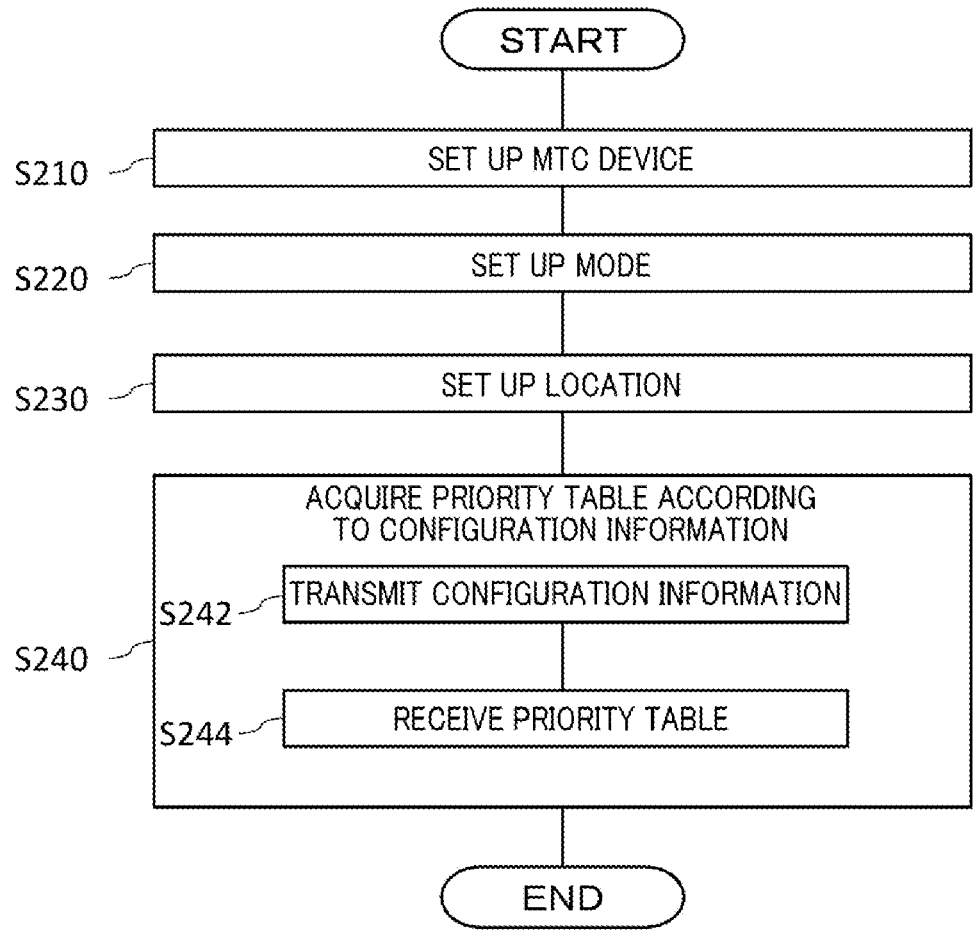
FIG. 2 illustrates one example of a flow of performing the initial configuration of the MTC device 100.

FIG. 2 illustrates one example of initial configuration flow of MTC device 100. In step 210, for example, a user installs the MTC device 100 in the plant that he or she operates. And, the user connects the MTC device 100 to the field devices installed in the plant via the LAN communication unit 160.

In step 220, the MTC device 100 sets up a mode. As one example, the MTC device 100 receives a user input, and sets up the mode such as a high capacity mode, a low delay mode and high reliability mode according to requirements for an application the MTC device 100 uses.

In step 230, the MTC device 100 sets up a location. As one example, when the location information is obtainable through the GPS (Global Positioning System) and so on, the MTC device 100 sets up the acquired location information as the location of the MTC device 100. When the location information is not obtainable, the MTC device 100 may also receive a user input and set up the location according to the user inputs, as the location of the MTC device 100, for example.

In step 240, the MTC device 100 acquires a priority table according to the configuration information. As one example, in step 242, the MTC device 100 transmits the configuration information about the mode set up in step 220 and the location set up in step 230, to an external server or the like that manages the priority table. On this occasion, the MTC device 100 may access to the external server via the wireless WAN communication unit, for example, by using the set of the SIM 110 and the communication carrier set up by default. And, in step 244, the MTC device 100 receives and acquires, from the external server, the priority table according to the mode and the location set up.

Moreover, in the above description, one example about the cases of the MTC device 100 receiving and acquiring the priority table from the external server has been described. However, it is not limited to this. For example, when the respective priority table for each mode and location is prestored in the internal memory, the MTC device 100 may read and obtain, from the internal memory, the priority table according to the mode and location set up. In this manner, the MTC device 100 ends the initial configuration.

Figure 3:
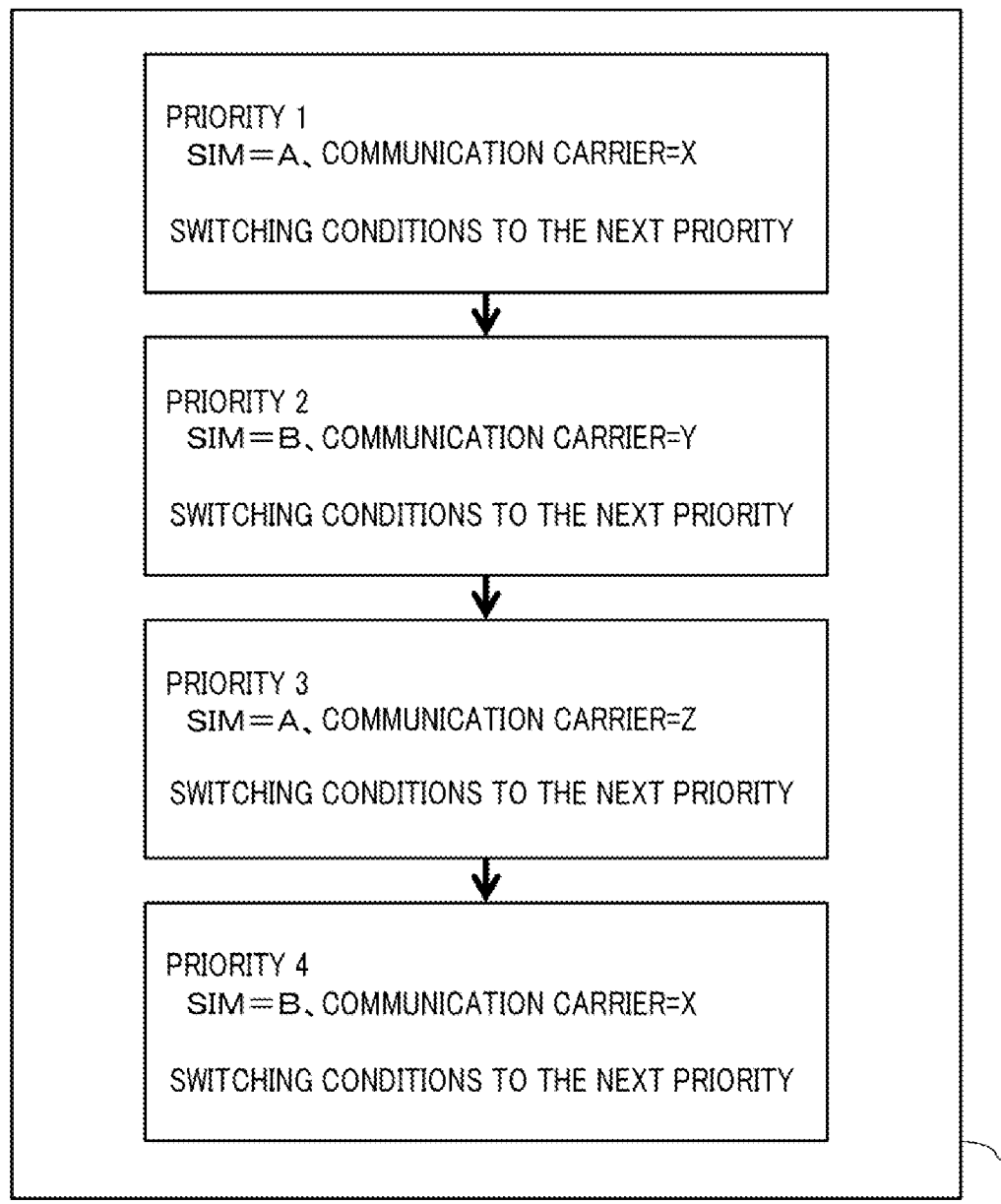
FIG. 3 illustrates one example of a priority table 300 that the memory unit 140 may have.

FIG. 3 illustrates one example of a priority table 300 that the memory unit 140 may have. The memory unit 140 stores, for example, the priority table 300 acquired through the flow shown in FIG. 2. The memory unit 140, as shown in this diagram, stores, for example, the set of SIM=A and communication carrier=X as priority 1. That is, the memory unit 140 stores, as the highest priority, connecting to the wireless communication network provided by the communication carrier X using the first SIM 110A lent from the communication carrier X, to perform wireless communications. Also, the memory unit 140 stores the set of SIM=B and communication carrier=Y as priority 2. That is, the memory unit 140 stores, as the priority next to priority 1, connecting to the wireless communication network provided by the communication carrier Y using the second SIM 110B lent from the MVNO, to perform wireless communications. Similarly, the memory unit 140 stores the set of SIM=A and communication carrier=Z as priority 3. That is, the memory unit 140 stores, as the priority next to priority 2, connecting to the wireless communication network provided by the communication carrier Z using the first SIM 110A lent from the communication carrier X, to perform wireless communications. Similarly, the memory unit 140 stores the set of SIM=B and communication carrier=X as priority 4. That is, the memory unit 140 stores, as the priority next to priority 3, connecting to the wireless communication network provided by the communication carrier X using the second SIM 110B lent from the MVNO, to perform wireless communication.

Herein, the number of the selectable sets of the SIMs 110 and the communication carriers stored in the priority table 300 is defined as M. Therefore, in this diagram, it is assumed that the memory unit 140 stores the priority table 300 with M=4. Such a plurality of (M) sets of the SIMs 110 and the communication carriers, as stated above, may include at least one roaming set whose communication carrier is different from the operator providing the SIM 110.

The memory unit 140 stores the switching conditions for determining the transition to the next priority for each of the M sets in the priority table 300. The memory unit 140 may store the minimum allowable value about the communication quality and the like as such switching conditions. More particularly, the memory unit 140 may store at least any of the following as the minimum allowable value about the communication quality: allowable time period and allowable frequency in a state of communications being unavailable, allowable frequency of communication disconnection, allowable frequency of communication start-up failure, the minimum transmission speed and allowable time period and frequency of states without meeting the minimum transmission speed, the minimum response speed and allowable frequency of occurrence of delays without meeting the minimum response speed, and the like.

These switching conditions may be decided based on fees of communications and the limit of data volume determined by individual contract respectively entered into for each set of the SIM 110 and the communication carrier, and communication requirements for applications to use. And, the MTC device 100 periodically measures the communication quality, and when the communication quality satisfies the switching condition, controls the switching to the set of the SIM 110 and the communication carrier, which is the next priority.

Moreover, the switching conditions may be set up differently according to switching from which to which priority. For example, regarding switching from priority 1 to priority 2, since the difference of communication fees determined in contracts is large, a switching condition which cannot be easily switched may be set up so that it is not until a massive deterioration of communication quality occurs at priority 1 that the priority switches. On the other hand, regarding the switching from priority 2 to priority 3, and the switching from priority 3 to priority 4, since the difference of communication fees determined in contracts is small, a switching condition which can be easily switched may be set up so that switching can easily occur in less-strict conditions.

Figure 4:
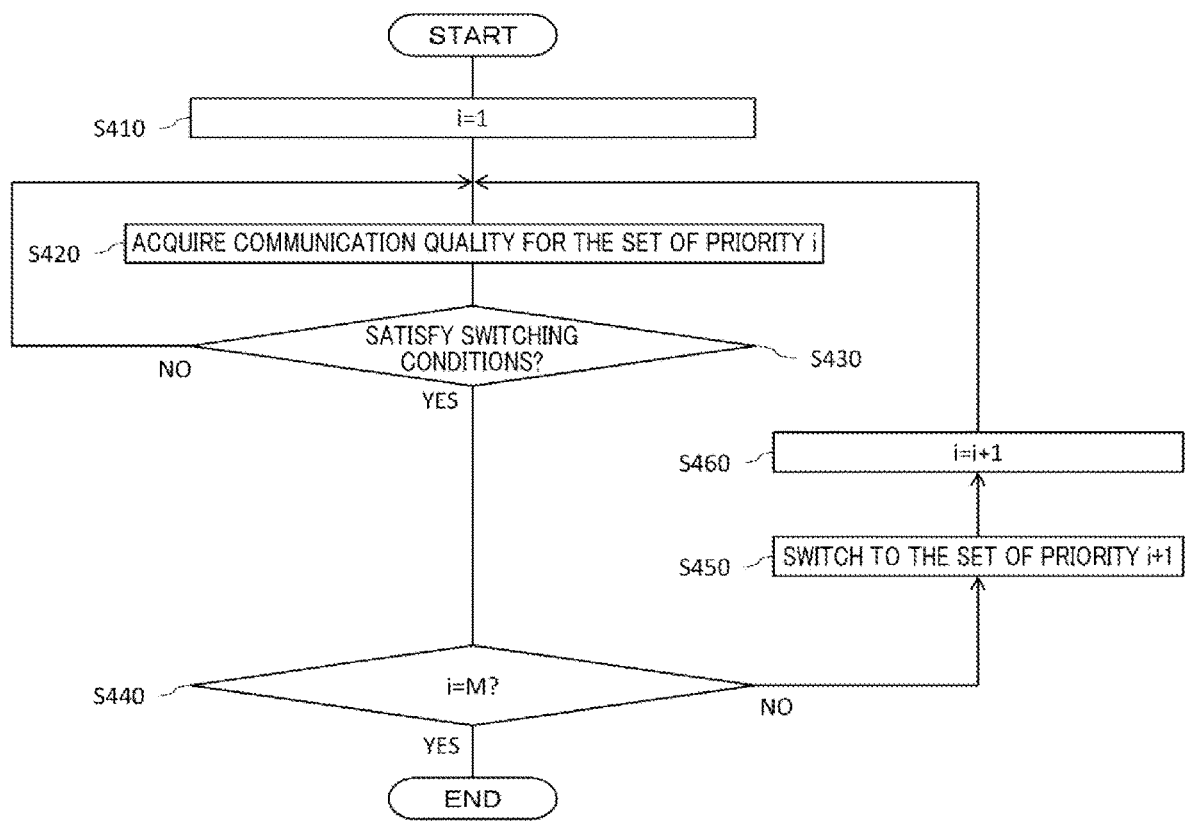
FIG. 4 illustrates one example of a flow in which the MTC device 100 switches at least any one of a SIM 110 and a communication carrier.

FIG. 4 illustrates one example of a flow in which the MTC device 100 switches at least any one of the SIM 110 or the communication carrier. In step 410, the control unit 150 sets up the priority number i to 1. And, the control unit 150 acquires a switching condition of priority 1 from the memory unit 140.

In step 420, the control unit 150 acquires communication quality for the set of priority i. In step 420 next to step 410, the control unit 150 acquires communication quality measured by the measuring unit 130 in the case of the set of priority 1, that is, in the case that the wireless WAN communication unit 120 connects to the wireless communication network provided by the communication carrier X using the first SIM 110A lent from the communication carrier X to perform wireless communication.

In step 430, the control unit 150 compares the communication quality provided by the measuring unit 130 in step 420 and the switching condition provided by the memory unit 140 in step 410, and then judges whether the communication quality satisfies the switching condition.

On this occasion, the control unit 150 may judge whether at least one item of the communication quality satisfies the switching condition. Instead of that, the control unit 150 may judge whether a plurality of items of the communication quality satisfies the switching conditions at the same time. Also, the control unit 150 may calculate a score value based on the plurality of items of the communication quality, and judge whether the calculated score value satisfies the switching condition. If the communication quality is judged not to satisfy the switching condition, the control unit 150 returns the processing to step 420 and repeats the processing of step 420 to step 430.

On the other hand, if the communication quality is judged to satisfy the switching condition, the control unit 150 judges whether i matches M in step 440. That is, the control unit 150 judges whether currently selected priority i is the last set M stored in the priority table 300. If i is judged to match M, the control unit 150 ends the processing.

On the other hand, if i is judged not to match M, the control unit 150 switches from the set of priority i to the set of priority i+1 which is next to in step 450. In step 450 next to step 410, the control unit 150 switches from the set of priority 1 to the set of priority 2, that is, switches to the wireless communication connected to the wireless communication network provided by the communication carrier Y using the second SIM 110B lent from the MVNO.

In step 460, the control unit 150 increments i by 1. Also, the control unit 150 acquires a switching condition of new priority i from the memory unit 140. And, the control unit 150 returns the processing to step 420, and repeats the processing from step 420 to step 460. In this manner, when the communication quality satisfies the corresponding switching condition of the set of the SIM 110 and the communication carrier currently in use, the control unit 150 controls the switching of at least any one of the SIM 110 and the communication carrier. On this occasion, the control unit 150 switches at least any one of the SIM 110 and the communication carrier according to the priority.

Moreover, as a result of following the procedure, if none of the sets stored in the priority table 300 is selected, the MTC device 100 may re-execute the flow after the expiration of the predetermined waiting period. In this case, the MTC device 100 may control the waiting period to gradually increase according to the number of executing the procedure. That is, the MTC device 100 may control the waiting period between the second time of execution and the third time of execution of the procedure to be longer than the waiting period between the first time of execution and the second time of execution of the procedure.

Also, as a result of following the procedure, if none of the sets stored in the priority table 300 is selected, the MTC device 100 may control the switching conditions to be gradually eased according to the number of times the procedure has been executed. That is, when executing the procedure for the second time, the MTC device 100 may control to apply the more relaxed switching condition than that applied in the procedure for the first time.

Also, according to the procedure, when a set with a priority other than priority 1 is selected, the MTC device 100 may control to attempt to switch to a set with higher priority than the set currently in use at predetermined intervals. For example, according to the procedure, when the set of priority 3 is selected, during performing the wireless communication using the set of priority 3, the MTC device 100 may also control to attempt to switch to the set of priority 1 or priority 2 at predetermined intervals.

For example, by using roaming technology, even a single SIM may be able to use, in the same area, the plurality of wireless communication networks offered by the plurality of communication carriers. However, with conventional dual-SIM terminals, switching between SIMs is based on the precondition that there is a one-to-one correspondence between the SIM and the communication carrier, and when a single SIM is able to choose the plurality of communication carriers, it was not taken into account how to switch the SIMs and communication carriers. Also, with conventional dual-SIM terminals, the only trigger for switching the SIM was that the communication volume exceeded the upper limit. Therefore, with conventional dual-SIM terminals, for example, by using roaming technology, even if a more optimal set of SIM and communication carrier was available, it might not have been selected. Also, with conventional dual-SIM terminals, because the SIM would not be switched unless the communication volume exceeds the upper limit, even if the wireless communication could be performed using the selected SIM and communication carrier, it was still possible for applications being practically unusable due to the communication quality not meeting the application requirements. In contrast to this, the MTC device 100 according to this embodiment treats a set of SIM 110 and communication carrier as one unit, and when the communication quality satisfies the switching condition associated with each set, controls the switching of at least any one of the SIM 110 and the communication carrier. Thereby, with MTC device 100 according to this embodiment, the combination of the SIM 110 and the communication carrier used for communication can be optimally controlled according to the communication quality.

Also, even if using the same SIM, when connected to a wireless communication network provided by different communication carrier, lines allocated to communication and communication fees can vary according to the respective contracts. Similarly, even if being connected to the wireless communication network provided by the same communication carrier, when using different SIM, lines allocated to communication and communication fees can vary according to the respective contracts. In this manner, lines allocated to communication and communication fees depend on the combinations of SIMs and communication carriers. The MTC device 100 according to this embodiment controls the switching depending on the priority set up for each set of the SIM 110 and the communication carrier. In this manner, the MTC device 100 according to this embodiment sets up the priority in the unit of a set of a SIM and a communication carrier rather than in the unit of a SIM or in the unit of a communication carrier, so that the switching can be performed in accordance with the reality of the communication contract, in which the combination of a SIM and a communication carrier determines the line allocation and communicating fee.

Figure 5:
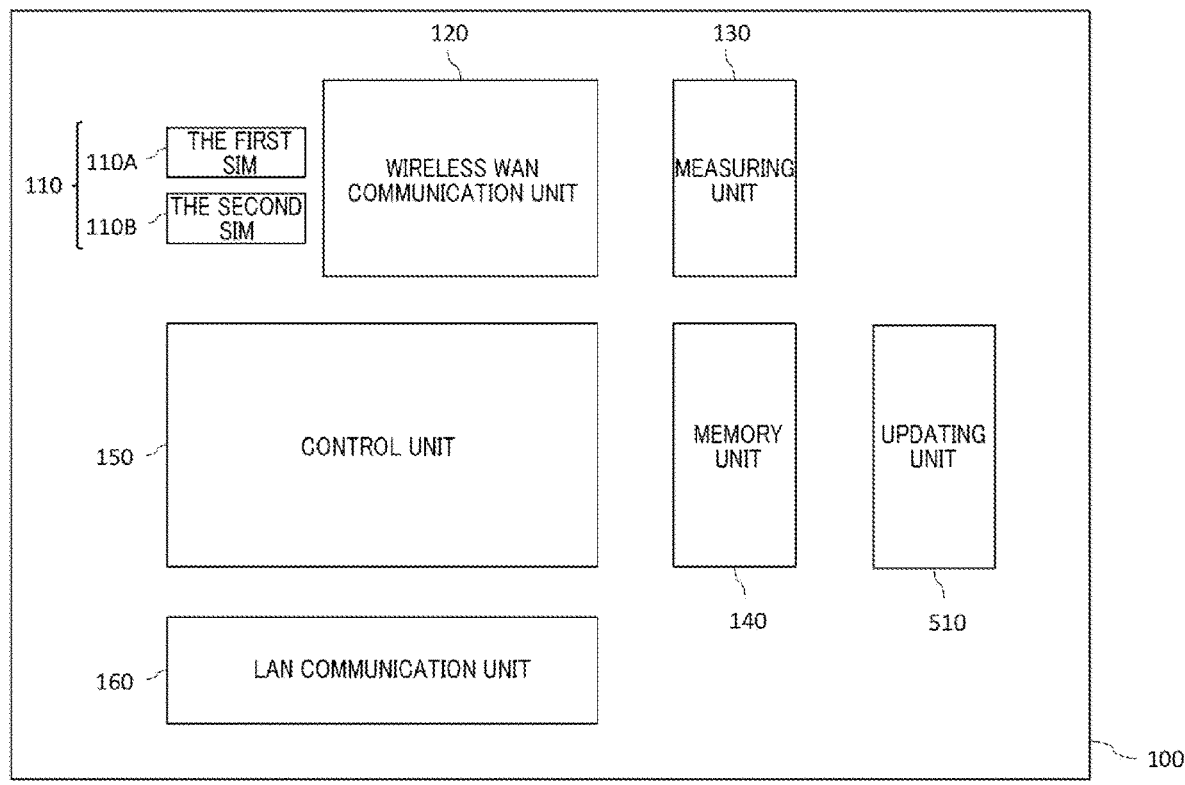
FIG. 5 illustrates one example of a block diagram of the MTC device 100 according to a variation of this embodiment.

FIG. 5 illustrates one example of a block diagram of an MTC device 100 according to a variation in this embodiment. In this diagram, members having the same functions and configuration as in FIG. 1 are given the same reference marks, and the description is omitted hereafter except for the differences. The MTC device 100 according to this variation further includes an updating unit 510 for dynamically updating the priority for each of the plurality of sets of SIMs 110 and communication carriers according to the predetermined conditions.

Depending on the contract, if the cumulative data usage exceeds the upper limit value in a predetermined period (for example, a month), the allocated communication lines may be restricted and the communication speed may be regulated. The MTC device 100 according to this variation properly controls the switching of SIMs 110 and communication carriers even in this situation.

In this case, the measuring unit 130 provides information about the measured cumulative data usage to the updating unit 510. And, the updating unit 510 updates the priority according to the cumulative data usage in a predetermined period for at least one of a plurality of sets. For example, the updating unit 510 compares the monthly cumulative data usage of the set currently in use with the upper limit value of speed restriction determined in the contract of the set currently in use. And, the updating unit 510 updates the priority to lower the priority for the set currently in use in the priority table stored by memory unit 140, when the monthly cumulative data usage of the set currently in use exceeds or is expected to exceed the upper limit value of speed restriction. Thereby, the MTC device 100 according to this variation can control not to aggressively perform, with high priority, switching to a set in which the communication speed has been regulated due to the cumulative data usage exceeding the upper limit value of speed restriction.

Also, depending on time zones, the number of users utilizing the communication lines varies for each wireless communication network. And then, as the amount of wireless resources allocated to a single device changes, the order of the communication speed of the plurality of wireless communication networks may also change depending on time zones. The MTC device 100 according to this variation properly controls the switching of SIMs 110 and communication carriers even in this situation.

In this case, the updating unit 510 may prestore the priorities of the sets of SIMs 110 and communication carriers for each time zone according to the past performance and the like. For example, the updating unit 510 may store respective priorities every three hours: 0:00 to 3:00, 3:00 to 6:00, 6:00 to 9:00, 9:00 to 12:00, 12:00 to 15:00, 15:00 to 18:00, 18:00 to 21:00, and 21:00 to 24:00. And, the updating unit 510 reads the priority for each time zone according to the current time, and then updates the priority in the priority table stored by memory unit 140, to fit the priority for each time zone. Thereby, the MTC device 100 according to this variation can properly control the switching of SIMs 110 and communication carriers, even when the order of the communication speed, and the like changes according to time zones.

In addition, the communication quality varies depending on the location of performing communications, such as the location where visibility from the base station can be obtained or the location where visibility from the base station is blocked. Then, the order of communication speed for the plurality of wireless communication networks may also change according to the location of performing communications. The MTC device 100 according to this variation properly controls the switching of SIMs 110 and communication carriers even in this situation.

In this case, the updating unit may prestore the priorities of the sets of SIMs 110 and communication carriers for each area according to the past performance and the like. And, the updating unit 510 reads the priority for each area according to the current location of the MTC device 100, and then updates the priority in the priority table stored by memory unit 140 to fit the priority of this area. Thereby, the MTC device 100 according to this variation can properly controls the switching of SIMs 110 and communication carriers, even if the order of the communication speed, and the like changes according to the location of performing communications.

In this manner, the updating unit 510 may dynamically updates the priority corresponding to each of the plurality of sets, according to cumulative data usage, time zone of performing communications, the location of performing communications, and so on. On this occasion, the updating unit 510 may change the switching conditions according to the priority updates. That is, the updating unit 510 may change the switching conditions stored by memory unit 140 for the set whose priority has been changed from the switching conditions before the priority was changed. For example, when the priority of the set of SIM=B and communication carrier=X changes from priority 4 to priority 3, the switching conditions of this set may be reconfigured to be different from the switching condition when its priority was priority 4. Thereby, the updating unit 510 can reconfigure the switching conditions reflecting the updated priority for each set.

In this manner, the MTC device 100 according to this variation dynamically updates the priority for each of the plurality of sets of SIMs 110 and communication carriers according to the predetermined conditions. When the MTC device 100 is installed and operated in a plant, various situations can change from the situation when initial configuration of the MTC device 100 was performed. The MTC device 100 according to this variation enables non-fixed priority setting by dynamically updating priorities according to predetermined conditions, and can flexibly respond to change in the situation and properly control the switching of SIMs 110 and communication carriers.

Figure 6:
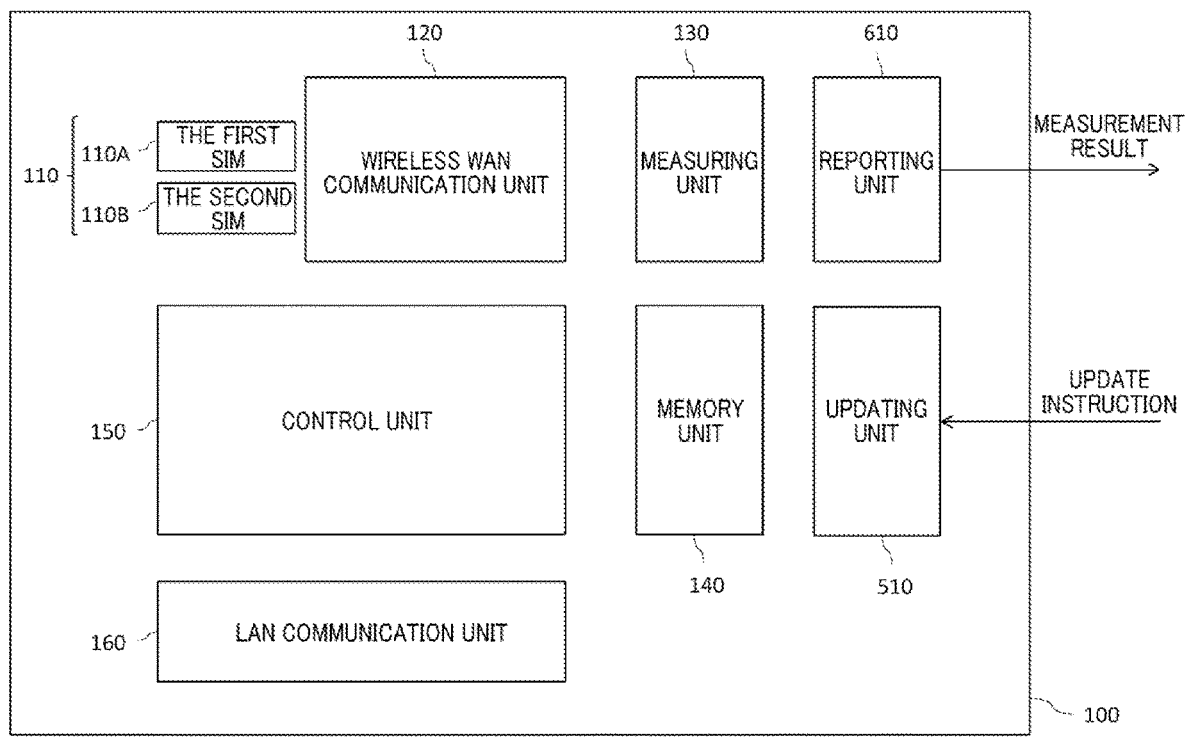
FIG. 6 illustrates one example of a block diagram of the MTC device 100 according to another variation of this embodiment.

FIG. 6 illustrates one example of a block diagram of the MTC device 100 according to another variation in this embodiment. In this diagram, members having the same functions and configuration as in FIG. 5 are given the same reference marks, and the description is omitted hereafter except for the differences. The MTC device 100 according to this other variation equips the function of updating the priority by coordinating with other devices (for example, the cloud).

For example, the contract terms of a communication carrier can be changed after the device is installed. Also, the requirements from applications can be changed from the time point when the device is installed. However, the device may not be aware of such a change. The MTC device 100 according to this other variation properly controls the switching of SIMs 110 and communication carriers even in this situation by coordinating with other devices.

In this other variation, the priority tables 300 for all the devices are managed collectively in the cloud. Herein, for example, regarding the MTC device 100, when contract terms with a communication carrier are changed during the contract period, or when the requirements of applications are changed in the middle, the other devices in the cloud update the priority table 300, and supply the updated priority table 300 to the updating unit 510 of the MTC device 100. And, the updating unit 510 updates the priority and the switching condition in the priority table 300 stored by memory unit 140 according to the instructions from other devices (the cloud). That is, the updating unit 510 controls the priority table 300 stored by the memory unit 140 to be replaced by the updated priority table 300 supplied by the devices in the cloud.

Thereby, even if there is a change in condition that the device cannot know, the MTC device 100 according to this other variation can control the switching of the set of SIM 110 and communication carrier according to the latest priority reflecting a change in condition without controlling the switching of the set of the SIM 110 and the communication carrier according to the priority corresponding to old condition.

Also, when updating the priority by coordinating with other devices, the MTC device 100 may further include a reporting unit 610 for reporting the measured communication quality to other devices. In this case, the measuring unit 130 measures quality of wireless communications by the SIM 110 and the communication carrier currently in use, and provides the measured quality to the reporting unit 610. And, the reporting unit 610 may report the information about the communication quality provided by the measuring unit 130 to other devices in the cloud. Thereby, in the cloud, the communication quality for the plurality of sets of SIMs and communication carriers can be collected from various devices. And, other devices in the cloud can use not only the communication quality reported from the MTC device 100, but also the communication quality collected from various devices, to update the priority table 300 further based on actual measurement value in the devices used under similar conditions.

Thereby, the MTC device 100 according to this other variation can set up the priority comprehensively considering the information of various devices running in the same environment, and properly control the switching of the SIM 110 and the communication carrier.

Figure 7:
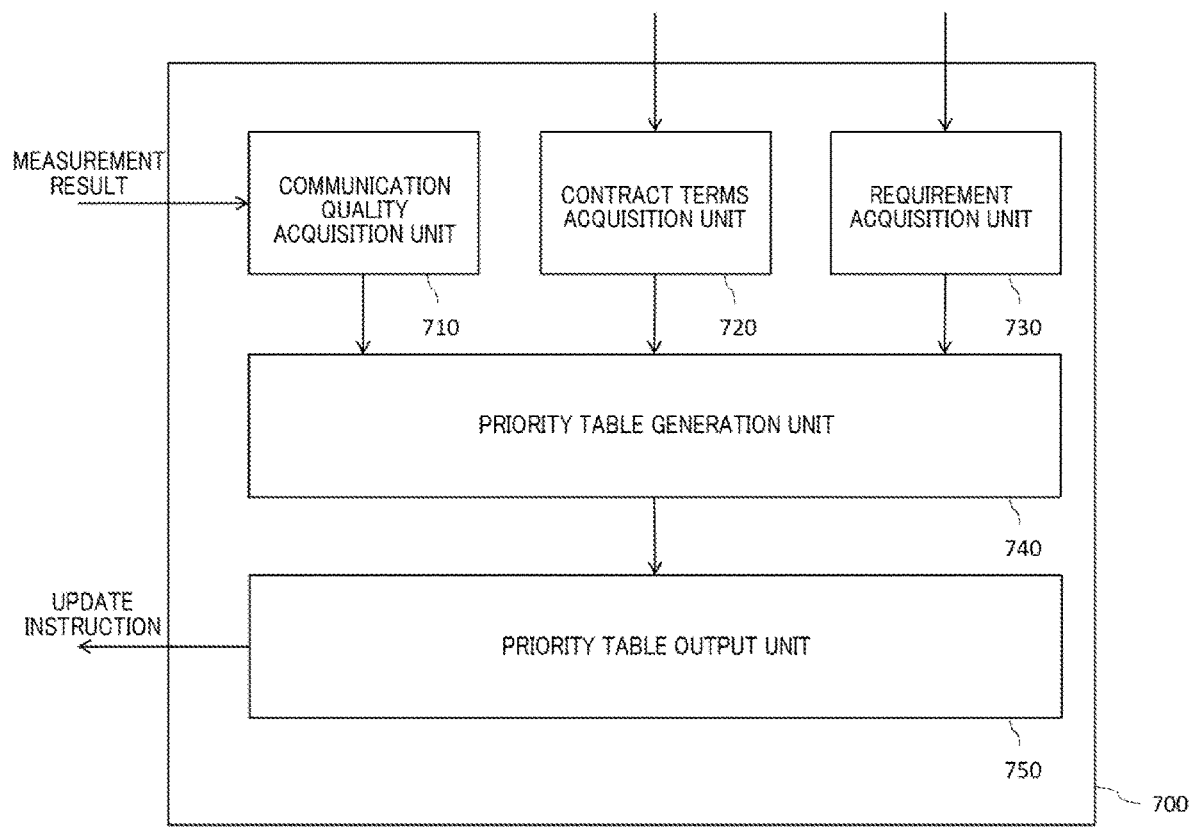
FIG. 7 illustrates one example of a block diagram of an apparatus 700 cooperating with the MTC device 100 according to another variation of this embodiment.

FIG. 7 illustrates one example of a block diagram of an apparatus 700 cooperating with an MTC device 100 according to another variation of this embodiment. Herein, one example where the apparatus 700 is realized by cloud computing is described. However, it is not limited to this. Such an apparatus 700 may be a computer such as a PC (personal computer), a tablet computer, a smart phone, a work station, a server computer, or a general purpose computer, or may also be a computer system connected by a plurality of computers. Such a computer system is also a computer in a broad sense. Also, such an apparatus 700 may be implemented by one or more executable virtual computer environments in the computer. Instead of that, such an apparatus 700 may be a dedicated computer designed to generate priority tables, or a dedicated hardware realized by dedicated circuits.

The apparatus 700 includes a communication quality acquisition unit 710, a contract terms acquisition unit 720, a requirement acquisition unit 730, a priority table generation unit 740 and a priority table output unit 750.

The communication quality acquisition unit 710 acquires information about communication quality measured by one or more devices. As one example, the communication quality acquisition unit 710 acquires measurement results of the communication quality for each set of a SIM and a communication carrier from the plurality of MTC devices 100 via a network. The communication quality acquisition unit 710 supplies the acquired information about the communication quality to the priority table generation unit 740.

The contract terms acquisition unit 720 acquires the information about the communication contract terms for each device. As one example, when the MTC device 100 is capable of communicating through a plurality of sets of SIMs and communication carriers, the contract terms acquisition unit 720, for each device, acquires the information about the contract terms for each set of a SIM and a communication carrier via the network. The contract terms acquisition unit 720 may acquire the information about the contract terms such as communication fee, communication speed and the upper limit of speed restriction. The contract terms acquisition unit 720 supplies the acquired information about the contract terms to the priority table generation unit 740.

The requirement acquisition unit 730 acquires the information about the communication requirements for each application executed by the device. As one example, the requirement acquisition unit 730 acquires the information about the communication speed and delay required by applications, for each application executed by the device, via the network. The requirement acquisition unit 730 supplies the acquired information about requirements to the priority table generation unit 740.

The priority table generation unit 740 generates the priority table for each device, which includes the priority for each set of a SIM and a communication carrier and the condition for switching to the next priority, based at least on information about the communication quality acquired by the communication quality acquisition unit 710 from one or more devices, and information about the contract terms for each device acquired by the contract terms acquisition unit 720. On this occasion, the priority table generation unit 740 may also generate the priority table further based on the requirements for each application acquired by the requirement acquisition unit 730. The priority table generation unit 740 supplies the generated priority table to the priority table output unit 750.

The priority table output unit 750 outputs the priority table generated by the priority table generation unit 740 to a target device. As one example, the priority table output unit 750 supplies the priority table generated by the priority table generation unit 740 to the target device via the network, and instructs the update of the priority table stored by the target device.

In such an apparatus 700, the priority table generation unit 740 may periodically perform the generation of the priority table, that is, may update the priority table. And, the priority table output unit 750 may periodically output the updated priority table to the target device.

Also, in such an apparatus 700, the priority table generation unit 740 may perform the generation of the priority table, that is, may update the priority table, when at least any one of the information about the contract terms acquired by the contract terms acquisition unit 720 and the information about the requirements acquired by the requirement acquisition unit 730 is changed. And, the priority table output unit 750 may output the updated priority table to the target device, triggered by the change in the contract terms or requirements.

Various embodiments of the present invention may be described with reference to flowcharts and block diagrams, wherein the blocks may represent (1) the stages of the process by which the operations are performed or (2) sections of the apparatus having the role of performing the operations. Specific stages and sections may be implemented by dedicated circuits, programmable circuits supplied together with computer readable instructions stored on a computer readable medium, and/or a processor supplied together with computer readable instructions stored on a computer readable medium. The dedicated circuit may include digital and/or analog hardware circuits, and may include integrated circuits (IC) and/or discrete circuits. Programmable circuits may include reconfigurable hardware circuits including Logical AND, Logical OR, Logical XOR, Logical NAND, Logical NOR, and other logic operations, and memory elements such as flip-flops, registers, field programmable gate arrays (FPGAs), and programmable logic arrays (PLAs), etc.

A computer readable medium may include any tangible device capable of storing instructions to be executed by an appropriate device. As a result, the computer readable medium having instructions stored therein will have a product that includes instructions that may be executed to create the means for performing operations specified in the flowchart or block diagram. Examples of the computer readable medium may include an electronic storage medium, a magnetic storage medium, an optical storage medium, an electromagnetic storage medium, a semiconductor storage medium and the like. More specific examples of the computer readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EPROM), a static random access memory (SRAM), a compact disc read-only memory (CD-ROM), a digital versatile disk (DVD), a blue-ray (registered trademark) disk, a memory stick, an integrated circuit card and so on.

Computer readable instructions may include assembler instructions, instruction set architecture (ISA) instructions, machine instructions, machine-dependent instructions, microcodes, firmware instructions, state-setting data, or object-oriented programming languages such as Smalltalk (registered trademark), Java (registered trademark), C++ and so on, and traditional procedural programming languages such as the "C" programming language or similar programming language, may also include either source code or object code written in any combination of one or more programming languages.

Computer readable instructions may be provided to a processor or programmable circuit of a general purpose computer, a special purpose computer, or other programmable data processing device locally or via a local area network (LAN), a wide area network (WAN) such as the Internet, and the computer readable instructions may be executed to create the means for performing operations specified in the flow chart or block diagram. Examples of processors include computer processors, processing units, microprocessors, digital signal processors, controllers, microcontrollers, and so on.

Figure 8:
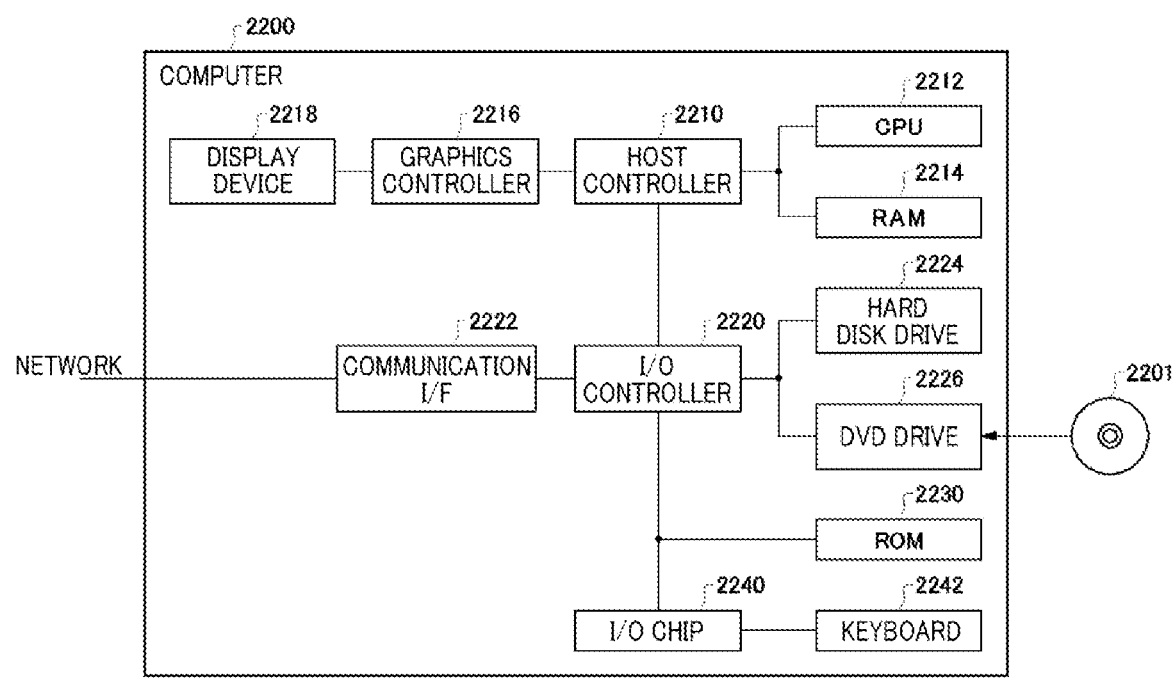
FIG. 8 illustrates an example of a computer 2200 in which a plurality of aspects of the present invention may be embodied in whole or in part.

FIG. 8 illustrates an example of a computer 2200 in which a plurality of aspects of the present invention may be wholly or partially embodied. A program installed in the computer 2200 can cause the computer 2200 to function as operations associated with apparatuses according to embodiments of the present invention or one or more sections of the apparatuses, and/or cause the computer 2200 to perform processes or stages of said processes associated with embodiments of the present invention. Such a program may be executed by a CPU 2212 to cause the computer 2200 to perform specific operations associated with some or all of the blocks of the flowcharts and block diagrams described in this specification.

The computer 2200 according to this embodiment includes the CPU 2212, a RAM 2214, a graphics controller 2216, and a display device 2218, which are interconnected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes legacy input/output units, such as a ROM 2230 and a keyboard 2242, which are connected to the input/output controller 2220 via an input/output chip 2240.

The CPU 2212 operates in accordance with the program stored in the ROM 2230 and the RAM 2214, thereby controlling each unit. The graphics controller 2216 acquires image data generated by the CPU 2212 in a frame buffer or the like provided in the RAM 2214 or in itself, so that the image data is displayed on the display device 2218.

The communication interface 2222 communicates with other electronic devices via a network. The hard disk drive 2224 stores programs and data used by the CPU 2212 in the computer 2200. The DVD-ROM drive 2226 reads the programs or data from the DVD-ROM 2201, and provides the programs or data to the hard disk drive 2224 via the RAM 2214. The IC card drive reads the programs and data from an IC card, and/or writes the programs and data into the IC card.

The ROM 2230 stores therein a boot program and the like that are executed by the computer 2200 at the time of activation and/or programs dependent on the hardware of the computer 2200. The input/output chip 2240 may also connect various input/output units to the input/output controller 2220 via a parallel port, a serial port, a keyboard port, a mouse port and so on.

Programs are provided by a computer readable medium such as the DVD-ROM 2201 or the IC card. The programs are read from the computer readable medium, installed in the hard disk drive 2224, the RAM 2214 or the ROM 2230 which is also an example of the computer readable medium, and then executed by the CPU 2212. Information processing described in these programs is read into the computer 2200, which results in a linkage between the programs and the various types of hardware resources described above. An apparatus or a method may be configured by accomplishing the operations or processing of information in accordance with the use of the computer 2200.

For example, when communications are performed between the computer 2200 and an external device, the CPU 2212 may execute a communication program loaded in the RAM 2214, and instruct the communication interface 2222 to perform communication processing based on the processing described in the communication program. The communication interface 2222 reads transmission data stored in a transmission buffer processing area provided in a recording medium such as the RAM 2214, the hard disk drive 2224, the DVD-ROM 2201 or the IC card, under the control of the CPU 2212, and transmits the read transmission data to a network, or writes the reception data received from the network into a reception buffer processing area or the like provided on the recording medium.

Also, the CPU 2212 may allow all or a necessary portion of the file or database stored on an external storage medium such as the hard disk drive 2224, the DVD-ROM drive 2226 (DVD-ROM 2201), the IC card to be read into the RAM 2214, and execute various types of processing on the data on the RAM 2214. The CPU 2212 then writes back the processed data to the external recording medium.

Various types of information such as various types of programs, data, tables and databases may be stored on the recording medium to undergo information processing. The CPU 2212 may perform various types of processing on the data read from the RAM 2214, including various types of operations, information processing, condition determination, condition branching, unconditional branching, information retrieval/replacement and so on, as described throughout the present disclosure and specified by the sequence of instructions of the program, and write the results back to the RAM 2214. Also, the CPU 2212 may search for information in a file, a database, etc. in the recording medium. For example, when a plurality of entries, each having the attribute value of a first attribute associated with the attribute value of a second attribute, are stored in the recording medium, the CPU 2212 may search among the plurality of entries for an entry matching a condition where the attribute value of the first attribute is specified, and read the attribute value of the second attribute stored within said entry, thereby acquiring the attribute value of the second attribute associated with the first attribute that satisfies the predetermined conditions.

The program or software module described above may be stored in a computer readable medium on the computer 2200 or in the vicinity of the computer 2200. Also, a recording medium such as a hard disk or a RAM provided within a server system connected to a dedicated communication network or the Internet can be used as a computer readable medium, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

100: MTC device, 110: SIM, 120: wireless WAN communication unit, 130: measuring unit, 140: memory unit, 150: control unit, 160: LAN communication unit, 300: priority table, 510: updating unit, 610: reporting unit, 700: apparatus, 710: communication quality acquisition unit, 720: contract terms acquisition unit, 730: requirement acquisition unit, 740: priority table generation unit, 750: priority table output unit, 2200: computer, 2201: DVD-ROM, 2210: host controller, 2212: CPU, 2214: RAM, 2216: graphics controller, 2218: display device, 2220: input/output controller, 2222: communication interface, 2224: hard disk drive, 2226: DVD-ROM drive, 2230: ROM, 2240: input/output chip, 2242: keyboard

What is claimed is:

1. An MTC device comprising:
a memory unit having a priority table for storing (i) a switching condition for switching at least any one of a SIM and a Mobile Network Operator (MNO) in association with each set of the SIM and the MNO and (ii) a priority of each set of the SIM and the MNO;
a measuring unit adapted to measure communication quality for a set of the SIM and the MNO currently in use among the sets of the SIM and the MNO; and
a control unit adapted to judge whether the communication quality satisfies the switching condition associated with the set currently in use, and control the switching of at least any one of the SIM and the MNO such that a set having a next priority is in use when it is judged that the switching condition is satisfied, wherein
if none of the sets stored in the priority table is selected, the control unit is adapted to control to (i) re-execute judging whether the communication quality satisfies the switching condition after a predetermined waiting period and increase the waiting period according to a number of times of executing the judging or (ii) re-execute the judging with a relaxed switching condition according to the number of times executing the judging,
the switching condition is selected from at least one of allowable time period and allowable frequency in a state of communications being unavailable, allowable frequency of communication disconnection, allowable frequency of communication start-up failure, a minimum transmission speed and allowable time period and frequency of states without meeting the minimum transmission speed, and a minimum response speed and allowable frequency of occurrence of delays without meeting the minimum response speed, and the communication quality is selected from at least one of which communication technology wireless communication network has been provided, data communication speed, packet error rate, disconnection frequency, time to connect, and signal response time.

2. The MTC device according to claim 1, wherein the memory unit further stores a priority corresponding to each of the sets, and the control unit switches at least any one of the SIM and the MNO depending on the priority.

3. The MTC device according to claim 2, further comprising:
an updating unit for dynamically updating the priority depending on a predetermined condition.

4. The MTC device according to claim 3, wherein the updating unit updates the priority depending on cumulative data usage in a predetermined period for at least one set of the sets.

5. The MTC device according to claim 3, wherein the updating unit updates the priority according to a time zone of performing communications.

6. The MTC device according to claim 3, wherein the updating unit updates the priority depending on a location of performing communications.

7. The MTC device according to claim 3, wherein the updating unit updates the priority and the switching condition depending on an instruction from another device.

8. The MTC device according to claim 7, further comprising:
a reporting unit for reporting the measured communication quality to the other device.

9. The MTC device according to claim 3, wherein the updating unit changes the switching condition depending on updating the priority.

10. The MTC device according to claim 1, wherein the sets include at least one roaming set, in which the MNO is different from an operator providing the SIM.

11. A method performed by an MTC device, the method comprising:
Storing in a priority table, by the MTC device, (i) a switching condition for switching at least any one of a SIM and a Mobile Network Operator (MNO) in association with each set of the SIM and the MNO and (ii) a priority of each set of the SIM and the MNO;
measuring, by the MTC device, communication quality for a set of the SIM and the MNO currently in use among the sets of the SIM and the MNO; and
controlling, by the MTC device, so as to judge whether the communication quality satisfies the switching condition associated with the set currently in use, and control the switching of at least any one of the SIM and the MNO such that a set having a next priority is in use when it is judged that the switching condition is satisfied, wherein
if none of the sets stored in the priority table is selected, the control unit is adapted to control to (i) re-execute judging whether the communication quality satisfies the switching condition after a predetermined waiting period and increase the waiting period according to a number of times of executing the judging or (ii) re-execute the judging with a relaxed switching condition according to the number of times executing the judging, the switching condition is selected from at least one of allowable time period and allowable frequency in a state of communications being unavailable, allowable frequency of communication disconnection, allowable frequency of communication start-up failure, a minimum transmission speed and allowable time period and frequency of states without meeting the minimum transmission speed, and a minimum response speed and allowable frequency of occurrence of delays without meeting the minimum response speed, and the communication quality is selected from at least one of which communication technology wireless communication network has been provided, data communication speed, packet error rate, disconnection frequency, time to connect, and signal response time.

12. An apparatus comprising:
a communication quality acquisition unit for acquiring information about communication quality measured by one or more devices;
a contract terms acquisition unit for acquiring information about communication contract terms for each device;
a priority table generation unit for generating a priority table for each device, containing (i) a switching condition to a next priority for each set of a SIM and a Mobile Network Operator (MNO), and (ii) a priority for each set of the SIM and the MNO, at least based on the information about the communication quality acquired from the one or more devices, and the information about the communication contract terms for each device wherein
the switching condition is further selected from at least one of allowable time period and allowable frequency in a state of communications being unavailable, allowable frequency of communication disconnection, allowable frequency of communication start-up failure, a minimum transmission speed and allowable time period and frequency of states without meeting the minimum transmission speed, and a minimum response speed and allowable frequency of occurrence of delays without meeting the minimum response speed, and the communication quality is further selected from at least one of which communication technology wireless communication network has been provided, data communication speed, packet error rate, disconnection frequency, time to connect, and signal response time; and
a priority table output unit for outputting the generated priority table to a target device.

13. A method comprising:
acquiring information about communication quality measured by one or more devices;
acquiring information about communication contract terms for each device; generating a priority table for each device, containing (i) a switching condition to a next priority for each set of a SIM and a Mobile Network Operator (MNO), and (ii) a priority for each set of the SIM and the MNO, at least based on the information about the communication quality acquired from the one or more devices, and the information about the communication contract terms for each device;
further selecting the switching condition from at least one of allowable time period and allowable frequency in a state of communications being unavailable, allowable frequency of communication disconnection, allowable frequency of communication start-up failure, a minimum transmission speed and allowable time period and frequency of states without meeting the minimum transmission speed, and a minimum response speed and allowable frequency of occurrence of delays without meeting the minimum response speed;

further selecting the communication quality from at least one of which communication technology wireless communication network has been provided, data communication speed, packet error rate, disconnection frequency, time to connect, and signal response time; and outputting the generated priority table to a target device.

* * * * *